US012062857B2

(12) United States Patent
Huang et al.

(10) Patent No.: US 12,062,857 B2
(45) Date of Patent: Aug. 13, 2024

(54) THREE-DIMENSIONAL ANTENNA MODULE

(71) Applicant: PEGATRON CORPORATION, Taipei (TW)

(72) Inventors: Chin-Ting Huang, Taipei (TW); Hsi-Kai Hung, Taipei (TW); Chun-Kai Wang, Taipei (TW); Sony Chayadi, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 137 days.

(21) Appl. No.: 17/952,145

(22) Filed: Sep. 23, 2022

(65) Prior Publication Data

US 2023/0155304 A1 May 18, 2023

(30) Foreign Application Priority Data

Nov. 18, 2021 (TW) ................................ 110143062

(51) Int. Cl.
*H01Q 25/00* (2006.01)
*H01Q 1/52* (2006.01)
*H01Q 1/22* (2006.01)

(52) U.S. Cl.
CPC ........... *H01Q 25/005* (2013.01); *H01Q 1/521* (2013.01); *H01Q 1/2291* (2013.01)

(58) Field of Classification Search
CPC .......... H01Q 1/22; H01Q 1/2291; H01Q 1/36; H01Q 1/50; H01Q 1/52; H01Q 1/521; H01Q 9/26; H01Q 21/00; H01Q 21/28; H01Q 25/005
See application file for complete search history.

(56) References Cited

U.S. PATENT DOCUMENTS 7,057,565 B1 6/2006 Liu
2013/0016024 A1 1/2013 Shi et al.
2013/0050031 A1* 2/2013 Zhu ...................... H01Q 1/2266 343/702
2014/0015720 A1 1/2014 Handro et al.

FOREIGN PATENT DOCUMENTS

CN 108808228 A * 11/2018 ............... H01Q 1/36
JP 2012199808 A * 10/2012 ............... H01Q 1/36
TW 201635643 10/2016

* cited by examiner

*Primary Examiner* — Hoang V Nguyen
(74) *Attorney, Agent, or Firm* — J.C. PATENTS

(57) ABSTRACT

A three-dimensional antenna module includes a first antenna, a second antenna, and a conductor. The first antenna includes a first main radiator and a first feeding section connected to the first main radiator. The first main radiator includes a first open end and a second open end. The first main radiator is bent to form a first opening. The second antenna includes a second main radiator and a second feeding section connected to the second main radiator. The second main radiator includes a third open end and a fourth open end. The second main radiator is bent to form a second opening. A direction the first opening faces is different from a direction the second opening faces. The conductor is disposed between the first antenna and the second antenna.

10 Claims, 4 Drawing Sheets

THREE-DIMENSIONAL ANTENNA MODULE

CROSS-REFERENCE TO RELATED APPLICATION

This application claims the priority benefit of Taiwan application serial no. 110143062, filed on Nov. 18, 2021. The entirety of the above-mentioned patent application is hereby incorporated by reference herein and made a part of this specification.

BACKGROUND

Technology Field

The disclosure relates to an antenna module, and in particular, to a three-dimensional antenna module.

Description of Related Art

There are three metrics in the industrial regulations for the built-in antenna for an IP network camera (or IP camera). The first metric is that the coverage area of the antenna radiation pattern should be wide, without blind spots for reception. The second metric is low peak gain. When the antenna radiates the maximum gain, the industry specification expects it to not exceed 6 dBi. Otherwise, in order to comply with CE's effective isotropically radiated power (EIRP) regulations, it is necessary to reduce the power of the amplifier circuit, and the relative communication distance is reduced accordingly. The third metric is that the isolation between each antenna is at the standard −20 dB or less. However, in the prior art, when the distance between two antennas is less than 20 mm, the isolation and the coverage area of radiation pattern may not meet the regulations.

SUMMARY

The disclosure provides a three-dimensional antenna module that may meet the wide coverage area of the antenna radiation pattern, low antenna gain, and good isolation.

A three-dimensional antenna module of the disclosure includes a first antenna, a second antenna, and a conductor. The first antenna includes a first main radiator and a first feeding section connected to the first main radiator, the first main radiator includes a first open end and a second open end, and the first main radiator is bent to form a first opening. The second antenna includes a second main radiator and a second feeding section connected to the second main radiator. The second main radiator includes a third open end and a fourth open end. The second main radiator is bent to form a second opening. A direction the first opening faces is different from a direction the second opening faces. The conductor is disposed between the first antenna and the second antenna.

In an embodiment of the disclosure, an outline shape of the conductor corresponds to a portion of an outline shape of the first main radiator or the second main radiator.

In an embodiment of the disclosure, each of the first main radiator and second main radiator is U-shaped.

In an embodiment of the disclosure, the conductor is L-shaped.

In an embodiment of the disclosure, a direction the first opening faces is opposite to a direction the second opening faces.

In an embodiment of the disclosure, the three-dimensional antenna module couples out a frequency band, and a length of the first main radiator is between ½ wavelength of the frequency band.

In an embodiment of the disclosure, the three-dimensional antenna module couples out a frequency band, and a length of the second main radiator is between ½ wavelength of the frequency band.

In an embodiment of the disclosure, the three-dimensional antenna module couples out a frequency band, and a length of the conductor is between ¼ wavelength of the frequency band.

In an embodiment of the disclosure, the frequency band is 2.4 GHz.

In an embodiment of the disclosure, a distance between the first antenna and the second antenna is between 2 cm and 10 cm.

Based on the above, the three-dimensional antenna module of the disclosure includes a first antenna and a second antenna, and the direction the first opening of the first main radiator faces is different from the direction the second opening of the second main radiator faces. Such a design may make the radiation pattern of the first antenna different from the radiation pattern of the second antenna, and may have the effect of complementing the pattern, and may reduce peak gain. In addition, the conductor is disposed between the first antenna and the second antenna, so as to effectively improve the isolation between the first antenna and the second antenna.

DESCRIPTION OF THE EMBODIMENTS

Figure 1:
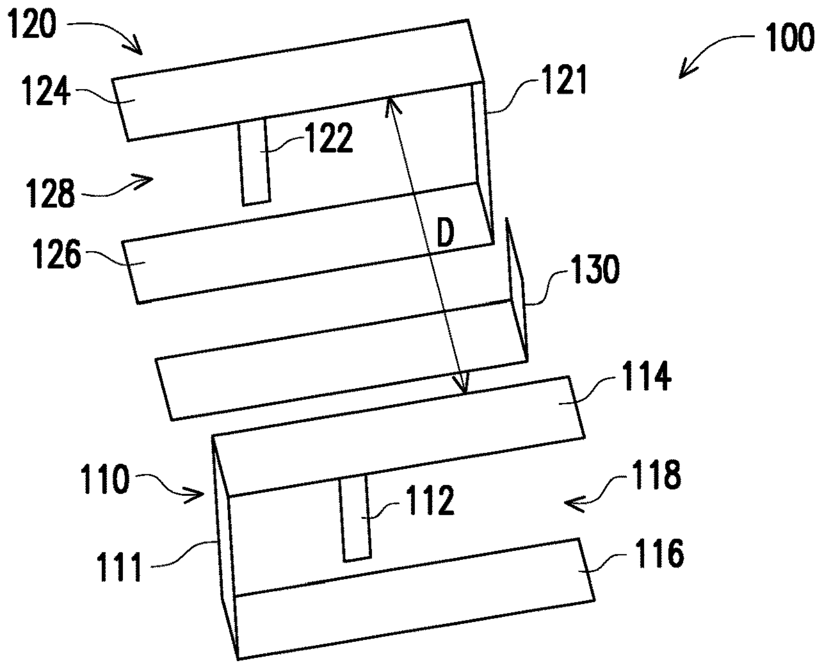
FIG. 1 is a schematic diagram of a three-dimensional antenna module according to an embodiment of the disclosure.

FIG. 1 is a schematic diagram of a three-dimensional antenna module according to an embodiment of the disclosure. Please refer to FIG. 1, a three-dimensional antenna module 100 of the present embodiment includes a first antenna 110, a second antenna 120, and a conductor 130. The first antenna 110, the second antenna 120, and the conductor 130 are all made of a conductive material, such as a metal.

The first antenna 110 includes a first main radiator 111 and a first feeding section 112 connected to the first main radiator 111. The first main radiator 111 includes a first open end 114 and a second open end 116.

In the present embodiment, the first feeding section 112 is closer to the first open end 114, the position of the first feeding section 112 may be a position where the impedance between the first open end 114 and the second open end 116 is 50Ω and the reactance should be close to zero, in order to achieve good impedance matching to excite the electromagnetic wave radiation for signal transmission.

Moreover, the second antenna 120 includes a second main radiator 121 and a second feeding section 122 connected to the second main radiator 121. The second main radiator 121 includes a third open end 124 and a fourth open end 126.

In the present embodiment, the second feeding section 122 is closer to the third open end 124, the position of the second feeding section 122 may be a position where the impedance between the third open end 124 and the fourth open end 126 is 50Ω and the reactance should be close to zero, in order to achieve good impedance matching to excite the electromagnetic wave radiation for signal transmission.

In the present embodiment, the shape and length of the first main radiator 111 and the second main radiator 121 are the same. The three-dimensional antenna module 100 resonates at a frequency band, and the frequency band is, for example, 2.4 GHz, but not limited thereto. The length of the first main radiator 111 is between ½ wavelength of the frequency band, and the length of the second main radiator 121 is between ½ wavelength of the frequency band.

That is, the first antenna 110 may resonate at this frequency band, and the second antenna 120 may resonate at the same frequency band as well. The design that both the first antenna 110 and the second antenna 120 may resonate at the same frequency band may be used to increase the bandwidth of this frequency band.

It is worth mentioning that the first main radiator 111 is bent into a U shape and has a first opening 118 located between the first open end 114 and the second open end 116. The second main radiator 121 is bent into a U shape and has a second opening 128 located between the third open end 124 and the fourth open end 126.

In the present embodiment, the direction the first opening 118 faces is different from the direction the second opening 128 faces. Such a design may make the radiation pattern of the first antenna 110 different from the radiation pattern of the second antenna 120, and may have the effect of complementing the pattern, and therefore may reduce peak gain.

Specifically, as shown in FIG. 1, the direction the first opening 118 faces (to the right) is opposite to the direction the second opening 128 faces (to the left). Of course, in other embodiments, the direction the first opening 118 faces may also only be different from the direction the second opening 128 faces. For example, the angle between the direction the first opening 118 faces and the direction the second opening 128 faces may be greater than 0 degrees and less than 180 degrees, such as 45 degrees or 90 degrees.

In addition, a distance D between the first antenna 110 and the second antenna 120 is, for example, between 2 cm and 10 cm. Since the distance D between the first antenna 110 and the second antenna 120 is very small, in order to avoid mutual interference between the first antenna 110 and the second antenna 120, in the present embodiment, the conductor 130 is disposed between the first antenna 110 and the second antenna 120 to increase the isolation between the first antenna 110 and the second antenna 120.

In the present embodiment, the length of the conductor 130 is between ¼ times the wavelength of this frequency band, so as to provide a good isolation. Further, the outline of the conductor 130 corresponds to a portion of the outline of the first main radiator 111 or the second main radiator 121.

For example, in the present embodiment, the conductor 130 may be L-shaped, matching to the portion of the second main radiator 121 extending from the fourth open end 126 to the right and upper side of FIG. 1. Of course, in other embodiments, the conductor 130 only needs to match a portion of the outline of the first main radiator 111 or the second main radiator 121, and it is not necessary to match from the open end.

Figure 2:
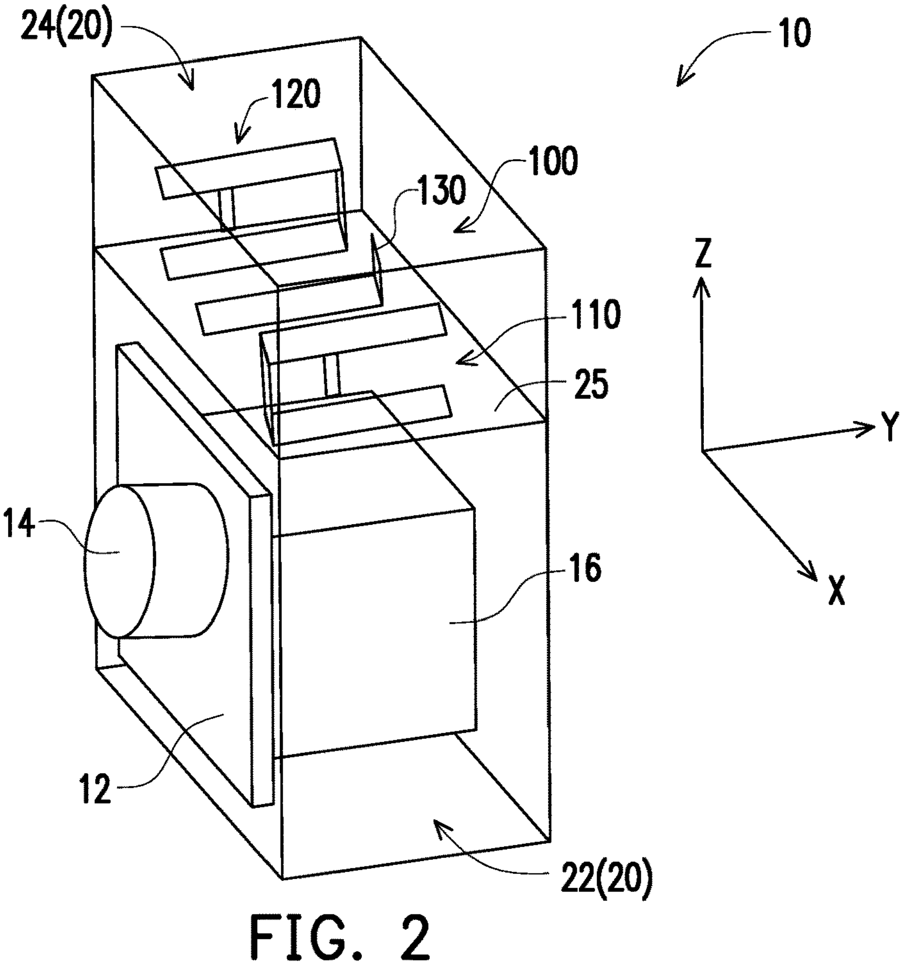
FIG. 2 is a schematic diagram of the three-dimensional antenna module of FIG. 1 disposed in an electronic device.

FIG. 2 is a schematic diagram of the three-dimensional antenna module of FIG. 1 disposed in an electronic device. Referring to FIG. 2, an electronic device 10 of the present embodiment is, for example, an IP camera. The electronic device 10 includes a casing 20, a circuit board 12, a lens 14, a battery 16, and the three-dimensional antenna module 100 of FIG. 1. An RF circuit, a CPU, a memory, a baseband circuit, etc., may be disposed on the circuit board 12. The three-dimensional antenna module 100 is electrically connected to the circuit board 12.

The casing 20 is, for example, a plastic casing 20, and the casing 20 is divided into a first space 22 and a second space 24 by, for example, a partition 25. The circuit board 12 and the battery 16 are disposed in the first space 22, and the three-dimensional antenna module 100 is disposed in the second space 24. Of course, in other embodiments, the casing 20 may only have the first space 22, and the three-dimensional antenna module 100 may also be disposed in the first space 22.

Figure 3:
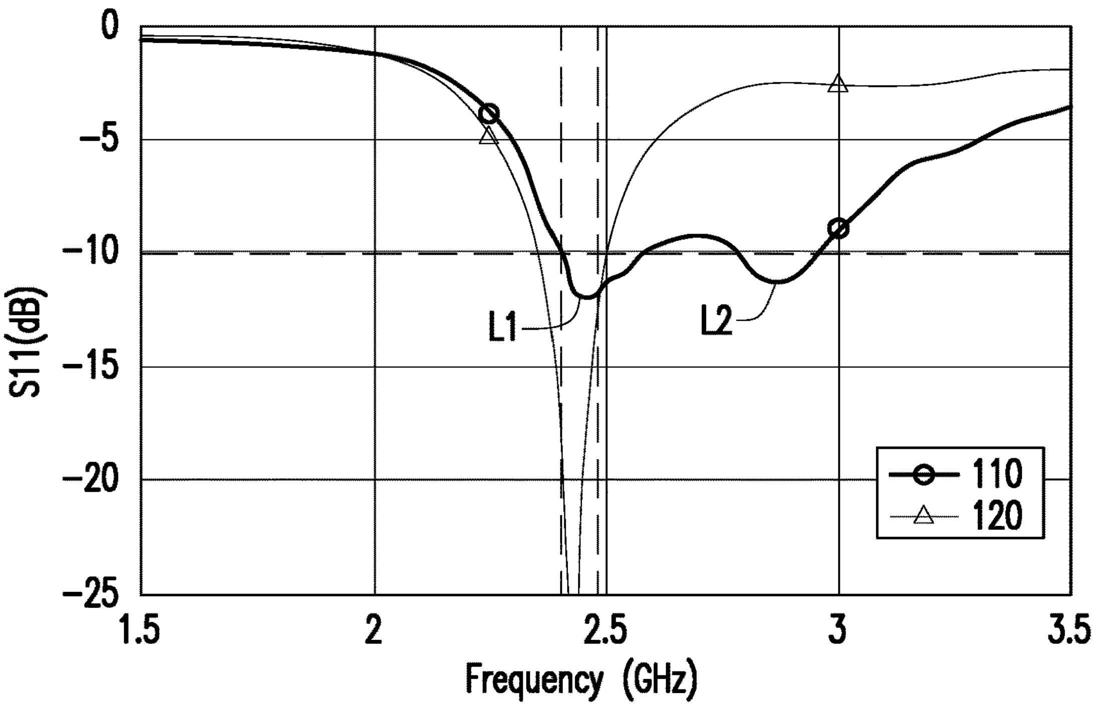
FIG. 3 is a frequency-S11 diagram of the three-dimensional antenna module of FIG. 1.

FIG. 3 is a frequency-S11 diagram of the three-dimensional antenna module of FIG. 1. Referring to FIG. 3, the first antenna 110 of the three-dimensional antenna module 100 may excite at a first resonance frequency (position L1) and a second resonance frequency (position L2) in a frequency band near WiFi 2.4G. The second antenna 120 may also excite at the Wi-Fi 2.4G frequency band. It may be seen from FIG. 3 that the S11 of the first antenna 110 and the second antenna 120 at WiFi 2.4G may both be lower than −10 dB to achieve good performance.

Figure 4:
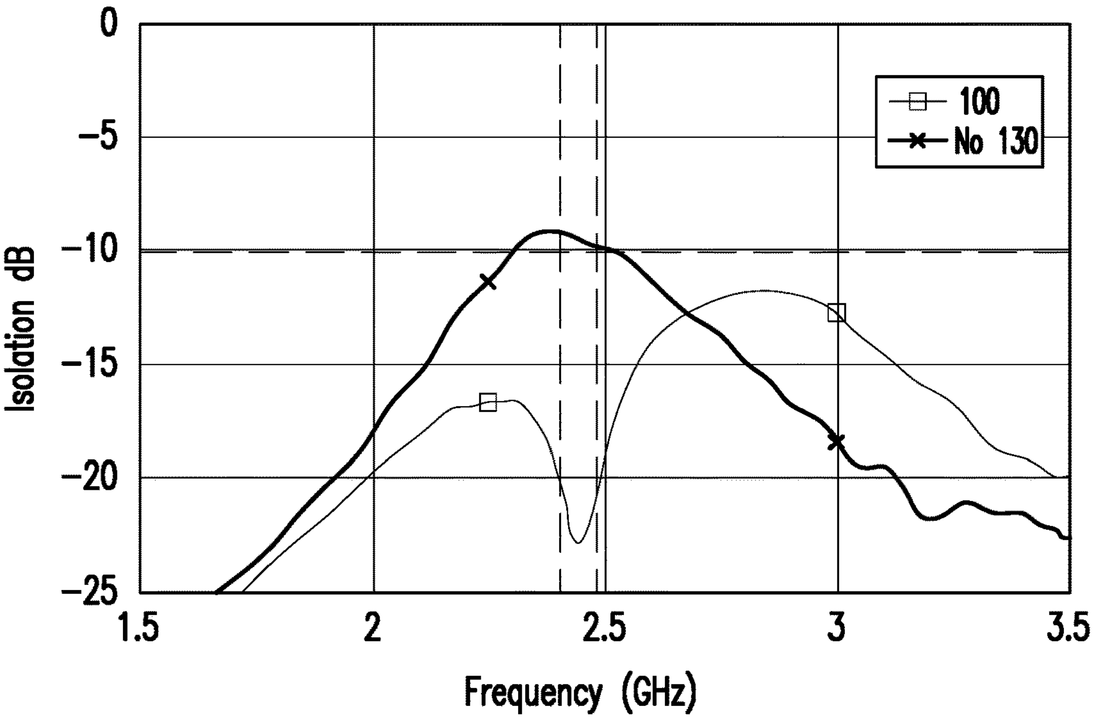
FIG. 4 is a frequency-isolation diagram of the three-dimensional antenna module of FIG. 1.

FIG. 4 is a frequency-isolation diagram of the three-dimensional antenna module of FIG. 1. Please refer to FIG. 4, the isolation of the three-dimensional antenna module 100 at 2.4 GHz is −20.35 dB. If the structure omits the conductor 130 (that is, there are only the first antenna 110 and the second antenna 120), the isolation is −9.31 dB. That is to say, the design of the conductor 130 disposed between the first antenna 110 and the second antenna 120 of the three-dimensional antenna module 100 may effectively reduce the isolation from −9.31 dB to −20.35 dB.

Figure 5A:
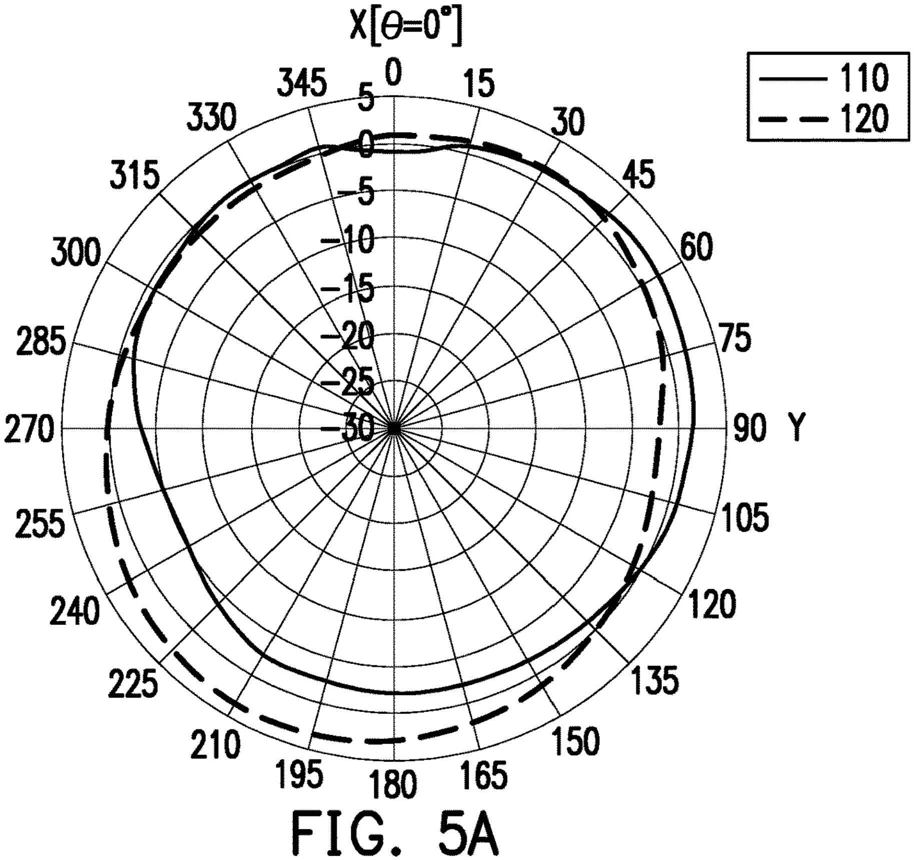
FIG. 5A to FIG. 5C are radiation patterns of the first antenna and the second antenna of the three-dimensional antenna module of FIG. 1 on the XY plane, the XZ plane, and the YZ plane.
Figure 5B:
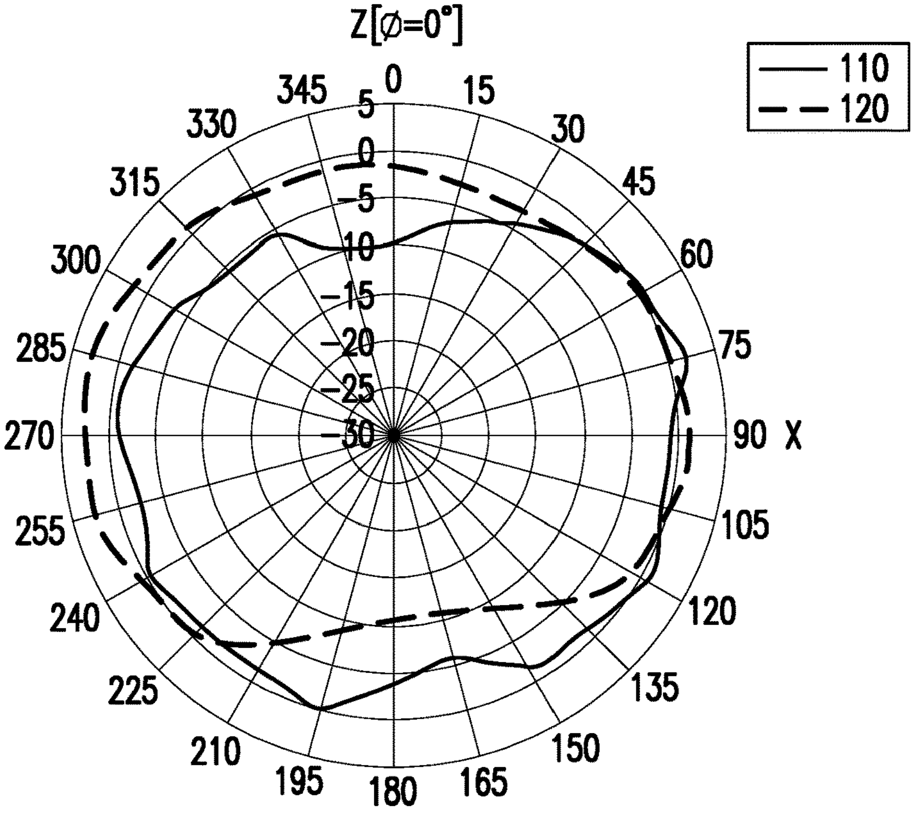
Figure 5C:
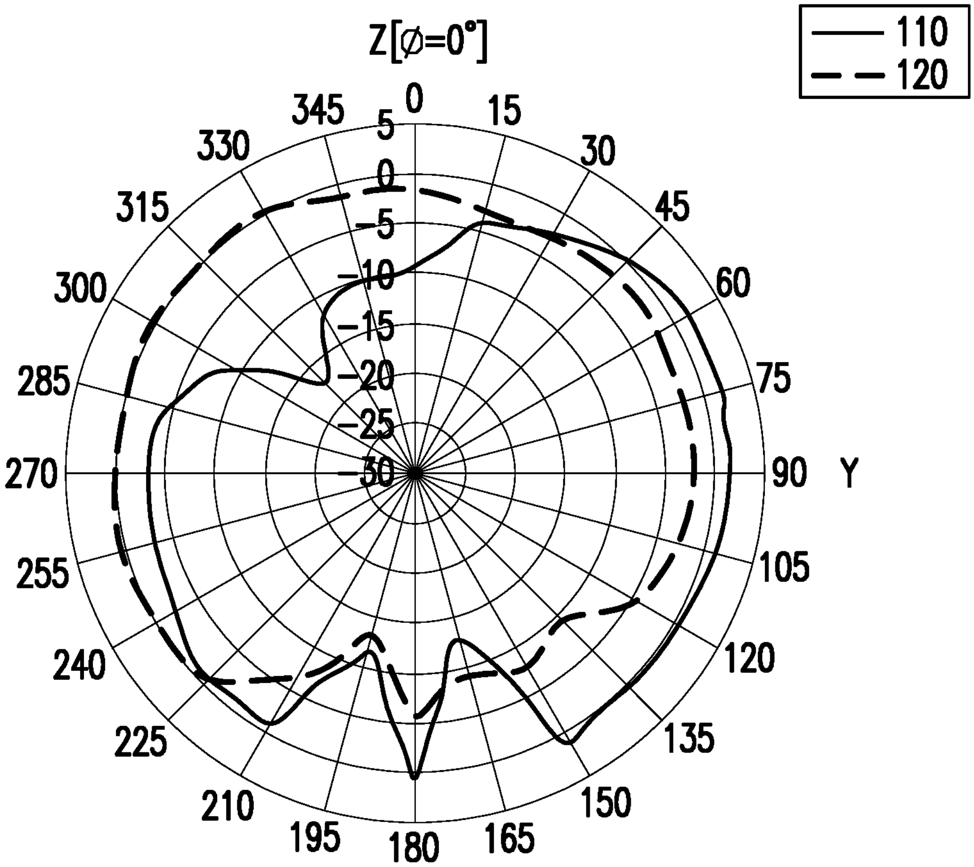

FIG. 5A to FIG. 5C are radiation patterns of the first antenna and the second antenna of the three-dimensional antenna module of FIG. 1 on the XY plane, the XZ plane, and the YZ plane. Referring first to FIG. 5A, on the XY plane, the radiation pattern of the first antenna 110 is slightly suppressed at 135 degrees to 285 degrees, and the radiation pattern of the second antenna 120 at 135 degrees to 285 degrees may complement the suppression of the radiation pattern of the first antenna 110 at 135 degrees to 285 degrees, thereby reducing the blind spot of receiving and transmitting signals in space.

Referring to FIG. 5B, on the XZ plane, the radiation patterns of the first antenna 110 and the second antenna 120 at 135 degrees to 225 degrees and 240 degrees to 30 degrees complement each other, thereby reducing the blind spot of receiving and transmitting signals in space. Specifically, the radiation pattern of the first antenna 110 is slightly suppressed at 240 degrees to 30 degrees, and the radiation pattern of the second antenna 120 at 240 degrees to 30 degrees may complement the suppression of the radiation pattern of the first antenna 110 at 240 degrees to 30 degrees. In addition, the radiation pattern of the second antenna 120 is slightly suppressed at 135 degrees to 225 degrees, and the radiation pattern of the first antenna 110 at 135 degrees to 225 degrees may complement the suppression of the radiation pattern of the second antenna 120 at 135 degrees to 225 degrees.

Referring to FIG. 5C, on the YZ plane, the radiation patterns of the first antenna 110 and the second antenna 120 at 45 degrees to 150 degrees and 225 degrees to 15 degrees complement each other, thereby reducing the blind spot of receiving and transmitting signals in space. Specifically, the radiation pattern of the first antenna 110 is slightly suppressed at 225 degrees to 15 degrees, and the radiation pattern of the second antenna 120 at 225 degrees to 15 degrees may complement the suppression of the radiation pattern of the first antenna 110 at 225 degrees to 15 degrees. In addition, the radiation pattern of the second antenna 120 is slightly depressed at 45 degrees to 150 degrees, and the radiation pattern of the first antenna 110 at 45 degrees to 150 degrees may complement the depression of the radiation pattern of the second antenna 120 at 45 degrees to 150 degrees.

In addition, according to the practical measured 3D pattern, the peak gain of the first antenna 110 at a frequency of 2440 MHz is 4.1 dBi, and the antenna efficiency thereof is 70.8%. The peak gain of the second antenna 120 at the frequency of 2440 MHz is 3.3 dBi, the antenna efficiency thereof is 72.6%, and therefore good performance is achieved.

From the above, it may be seen that the three-dimensional antenna module 100 of the present embodiment may meet the requirements of the built-in antenna used in an IP camera. Specifically, first, in the three-dimensional antenna module 100 of the present embodiment, via the design in which the first opening 118 of the main radiator 111 and the second opening 128 of the second main radiator 121 face different directions, the coverage area of the antenna radiation pattern may be wide.

Second, the peak gain of the antenna radiation of the three-dimensional antenna module 100 of the present embodiment is about 3 dBi to 4 dBi, which does not exceed the 6 dBi expected by industry specifications. Therefore, there is no need to reduce the power of the amplifier circuit, and the communication distance is not shortened as a result.

Third, when the distance D between the first antenna 110 and the second antenna 120 is less than 20 mm, the first antenna 110 and the second antenna 120 may meet the requirement that the isolation is at the standard of −20 dB or less. Therefore, the three-dimensional antenna module 100 of the present embodiment is quite suitable for use in an IP camera. Of course, the application field of the three-dimensional antenna module 100 of the present embodiment is not limited thereto.

Based on the above, the three-dimensional antenna module of the disclosure includes the first antenna and the second antenna, and the first opening of the first main radiator and the second opening of the second main radiator face different directions. Such a design may make the radiation pattern of the first antenna different from the radiation pattern of the second antenna, and may have the effect of complementary the pattern, and may reduce peak gain. In addition, the conductor is disposed between the first antenna and the second antenna, so as to effectively improve the isolation between the first antenna and the second antenna.

What is claimed is:

1. A three-dimensional antenna module, comprising:

a first antenna comprising a first main radiator and a first feeding section connected to the first main radiator, the first main radiator comprises a first open end and a second open end, and the first main radiator is bent to form a first opening;

a second antenna comprising a second main radiator and a second feeding section connected to the second main radiator, the second main radiator comprises a third open end and a fourth open end, the second main radiator is bent to form a second opening, and the first opening and the second opening face different directions; and a conductor disposed between the first antenna and the second antenna, wherein the first opening is located between the first open end and the second open end, the second opening is located between the third open end and the fourth open end, the first opening and the second opening are misaligned with each other.

2. The three-dimensional antenna module of claim 1, wherein an outline of the conductor matches a portion of an outline of the first main radiator or the second main radiator.

3. The three-dimensional antenna module of claim 1, wherein each of the first main radiator and the second main radiator is U-shaped.

4. The three-dimensional antenna module of claim 1, wherein the conductor is L-shaped.

5. The three-dimensional antenna module of claim 1, wherein the first opening and the second opening face the opposite directions.

6. The three-dimensional antenna module of claim 1, wherein the three-dimensional antenna module resonates at a frequency band, and a length of the first main radiator is between ½ wavelength of the frequency band.

7. The three-dimensional antenna module of claim 6, wherein the frequency band is 2.4 GHz.

8. The three-dimensional antenna module of claim 1, wherein the three-dimensional antenna module resonates at a frequency band, and a length of the second main radiator is between ½ wavelength of the frequency band.

9. The three-dimensional antenna module of claim 1, wherein the three-dimensional antenna module couples out a frequency band, and a length of the conductor is between ¼ wavelength of the frequency band.

10. The three-dimensional antenna module of claim 1, wherein a distance between the first antenna and the second antenna is between 2 cm and 10 cm.

* * * * *